(12) United States Patent
Davis et al.

(10) Patent No.: US 7,386,352 B2
(45) Date of Patent: Jun. 10, 2008

(54) MODULAR SENSOR NETWORK NODE

(75) Inventors: Jesse Harper Zehring Davis, Berkeley, CA (US); Douglas Paul Stark, Jr., Tracy, CA (US); Christopher Patrick Kershaw, Hayward, CA (US); Ronald Dean Kyker, Livermore, CA (US)

(73) Assignee: Sandia Corporation, Livermore, CA (US)

( * ) Notice: Subject to any disclaimer, the term of this patent is extended or adjusted under 35 U.S.C. 154(b) by 702 days.

(21) Appl. No.: 10/960,298

(22) Filed: Oct. 6, 2004

(65) Prior Publication Data

US 2006/0092042 A1 May 4, 2006

(51) Int. Cl.
*G05B 19/18* (2006.01)
*G01F 17/00* (2006.01)
*G06F 19/00* (2006.01)

(52) U.S. Cl. .............................. 700/9; 702/54; 702/116
(58) Field of Classification Search ............... 700/7, 700/9, 108, 291, 286; 702/52–54, 91, 93, 702/116
See application file for complete search history.

(56) References Cited

U.S. PATENT DOCUMENTS

| 5,621,669 A | * | 4/1997 | Bjornsson .................... 702/85 |
| 6,531,965 B1 | * | 3/2003 | Kaiser et al. .......... 340/870.01 |
| 6,980,152 B2 | * | 12/2005 | Steadman et al. ............ 342/14 |

* cited by examiner

*Primary Examiner*—Thomas K Pham
(74) *Attorney, Agent, or Firm*—Dorsey & Whitney LLP; Timothy P. Evans

(57) ABSTRACT

A distributed wireless sensor network node is disclosed. The wireless sensor network node includes a plurality of sensor modules coupled to a system bus and configured to sense a parameter. The parameter may be an object, an event or any other parameter. The node collects data representative of the parameter. The node also includes a communication module coupled to the system bus and configured to allow the node to communicate with other nodes. The node also includes a processing module coupled to the system bus and adapted to receive the data from the sensor module and operable to analyze the data. The node also includes a power module connected to the system bus and operable to generate a regulated voltage.

26 Claims, 4 Drawing Sheets

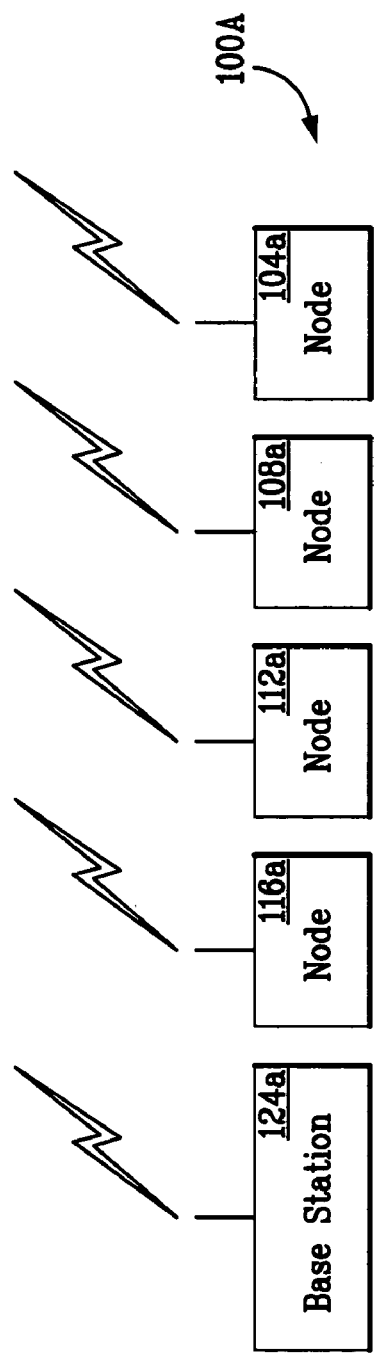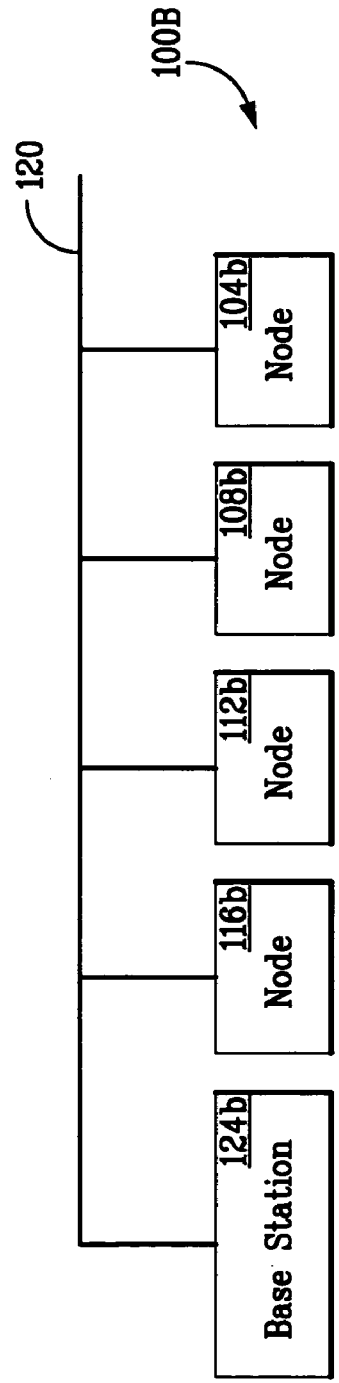

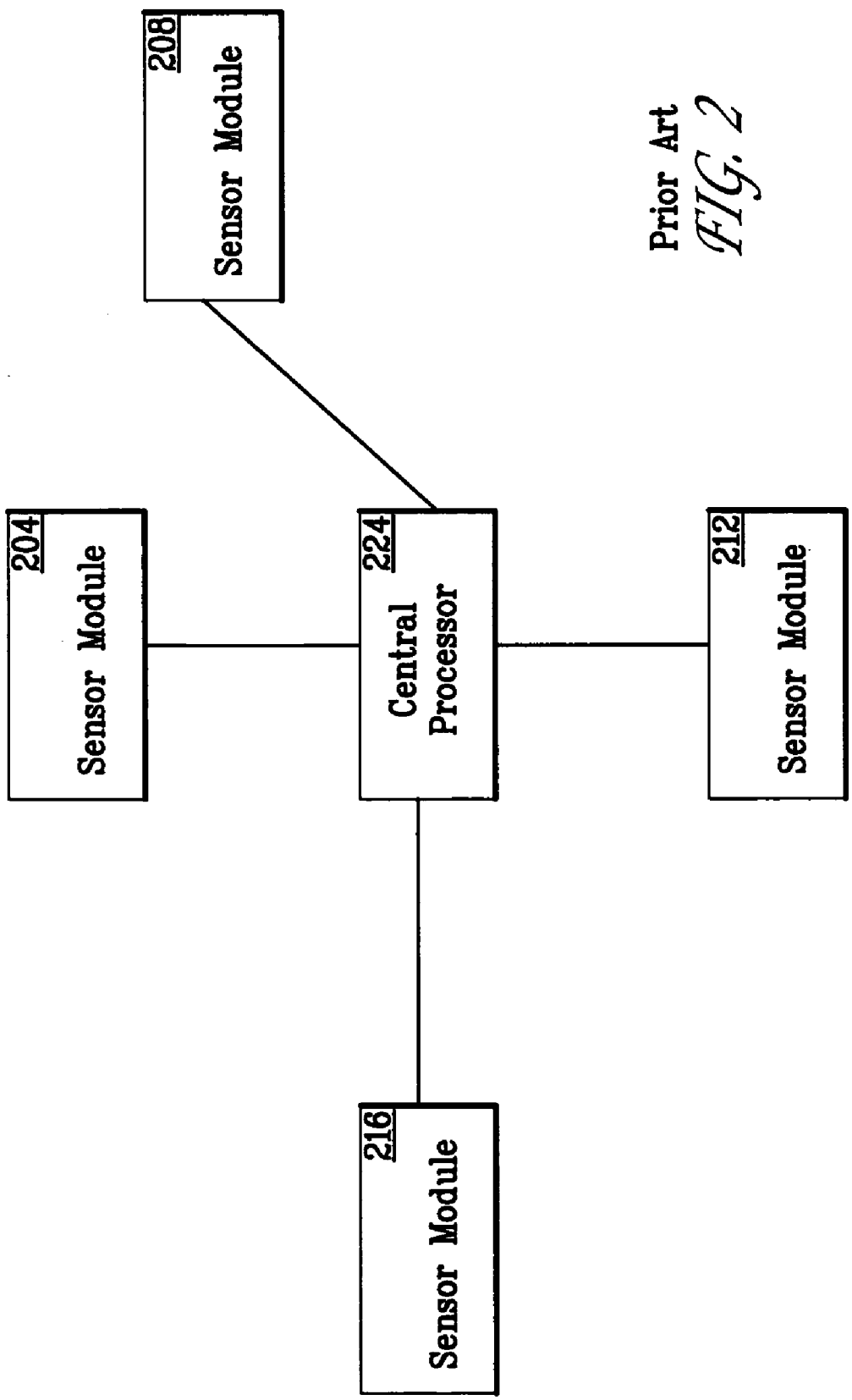
Prior Art FIG. 2

MODULAR SENSOR NETWORK NODE

STATEMENT REGARDING RESEARCH & DEVELOPMENT

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

The present invention relates generally to wireless sensor networks, and more specifically to modular sensor network nodes.

BACKGROUND OF THE INVENTION

Sensor network nodes are used in many applications. For example, sensor network nodes are used to monitor: seismic activities; atmospheric pressure, temperature and humidity; indoor and outdoor agriculture to increase yield; environmental variation on a fine grained scale; vibration in factories to predict machine failures; a ship's hull for cracks in a distributed fashion; and HVAC systems in large office buildings.

FIG. 1(a) is a block diagram of a conventional sensor network 100(a). The sensor network 100(a) can be used in many applications such as, for example, detection of sound, radiation, pollution, etc. The sensor network 100(a) includes a plurality of nodes 104(a), 108(a), 112(a), and 116(a). The nodes 104(a)-116(a) communicate with each other wirelessly. The sensor network 100(a) includes a base station 124(a) that communicates with the nodes 104(a)-116(a) wirelessly.

FIG. 1(b) is a block diagram of a conventional sensor network 100(b) where the nodes 104(b)-116(b) are connected to each other by a communication link 120, such as a wired link, an optical link, the Internet or any other communication link. The nodes 104(b)-116(b) can communicate with each other over the communication link 120. The sensor network 100(b) includes a base station 124(b) that communicates with the nodes 104(b)-116(b) over the communication link 120. The nodes 104(a)-116(a) and 104(b)-116(b) monitor their environment for data collection or event or object detection purposes. The nodes 104(a)-116(a) and 104(b)-116(b) may process and analyze the data to evaluate the event or the object. The nodes 104(a)-116(a) and 104(b)-116(b) can also transmit collected data to the base station 124(a) and 124(b), respectively, for analysis or storage.

FIG. 2 is a block diagram of one of the nodes 104(a)-116(a) and 104(b)-116(b) (shown in FIGS. 1(a) and 1(b)) in more detail. For ease of description, the node of FIG. 2 will be designated as the node 104. The node 104 includes sensor modules 204, 208, 212, 216 connected to a central processor 224. The sensor modules 204-216 sense the environment for data collection or event or object detection purposes. The sensor modules 204-216 typically do not have capability to process and analyze the data. Accordingly, the data collected by the sensor modules 204-216 are transmitted to the central processor 224. The central processor 224 processes the data to evaluate the event or the object. The node 104 transmits the processed data to the base station 124(a) or 124(b) (shown in FIGS. 1(a) and 1(b)) for storage and/or further analysis.

At present, two system level architectures are used for the wireless sensor network node. The first architecture incorporates an optimized, less powerful system that is specific to a single application. The first architecture generally includes a less powerful (i.e., low processing power), optimized central processor that is designed or chosen only for a specific application. Since the first architecture is specific to a single application, it is inflexible and cannot be extensively modified for other applications. For example, a wireless sensor network node may be designed exclusively for seismic applications. The central processor can be designed or chosen for only seismic related applications including processing and analyzing seismic data, and therefore the central processor need not be a powerful processor. Since these specific central processors typically have low processing power, they consume relatively less power.

The second architecture incorporates a non-optimal, more powerful system that can be adapted for different applications. The second architecture includes a powerful central processor that can be used for different applications. Since the second architecture can be used for different applications, it is flexible. For example, a wireless sensor network node can be designed to monitor seismic events, radiation, or atmospheric pressure and temperature in different applications. The central processor is designed or chosen to be more general, flexible, and computationally powerful to process different types of data, and therefore the central processor needs to be a powerful processor (i.e., high processing power). Since the central processor must possess high processing power, it consumes a large amount of power.

The first architecture, which is the inflexible system, is generally a one time solution. The first architecture cannot be extensively adapted to different applications, but consumes relatively small amounts of power. The second architecture, which is the flexible system, consumes large amounts of power, but can be adapted to different applications. The second architecture is unsuitable for applications in locations where the sensor network node 104 (shown in FIG. 2) must operate on a limited power supply such as battery power. Thus, neither of these systems is satisfactory to produce efficient and flexible sensor systems.

Furthermore, the two architectures are essentially implemented around a central processor. The central processor is typically a microprocessor that performs all functions of the nodes. The central processor is required to perform complicated tasks as well as simple tasks simultaneously. For example, the central processor is required to perform complicated tasks such as processing and analysis of the sensed data, and also perform simple tasks related to the management and control of the node 104 including polling of the sensors 204-212. Thus, the two architectures utilize the central processor inefficiently.

Accordingly, there is a need for a wireless sensor network node system that is flexible and adaptable, yet that does not consume large amounts of power and is efficient for general use.

SUMMARY OF THE INVENTION

The present invention is directed to a modular sensor network node. The sensor network node may include a plurality of sensor modules coupled to a system bus and configured to sense a parameter and operable to generate data representative of the parameter. The parameter may be sound, radiation, temperature, pressure, pollution, or any other parameter. The node may include a communication module coupled to the system bus and configured to allow the network node to communicate with other nodes in the network. The node may also include a processing module coupled to the system bus and adapted to receive the data from the sensor module and to analyze the data. The node also includes a power module connected to the system bus and operable to generate one or several regulated voltages to power the node.

The sensor module may include a system resource configured to sense a parameter and operable to generate data representative of the sensed parameter. The sensor module also includes a resource specific processor coupled to the system resource and configured to control the system resource. The resource specific processor is a low power and low performance processor designed to perform limited specific tasks related to the management and control of the sensor module and use less power than other general purpose processors. The resource specific processor is adapted to receive the data from the system resource. The sensor module also includes a distributed controller coupled to the resource specific processor and operable to regulate the power consumption of the sensor module as well as provide communications with other modules on the same node. The sensor module may also include data storage coupled to the resource specific processor and adapted to store the data collected by the system resource

BRIEF DESCRIPTION OF THE DRAWINGS

FIGS. 1(a) and 1(b) are block diagrams of conventional sensor networks.

FIG. 2 is a block diagram of a node used in the sensor networks of FIGS. 1(a) and 1(b).

DETAILED DESCRIPTION

The various features and methods of the invention will now be described in the context of wireless sensor network nodes. Those skilled in the art will recognize that the invention is applicable to other types of network nodes.

Throughout the description of the invention, implementation-specific details will be given on how the invention is used to sense an event or an object. These details are provided to illustrate the preferred embodiments of the invention and not to limit the scope of the invention. The scope of the invention is set in the claims section.

Figure 3:
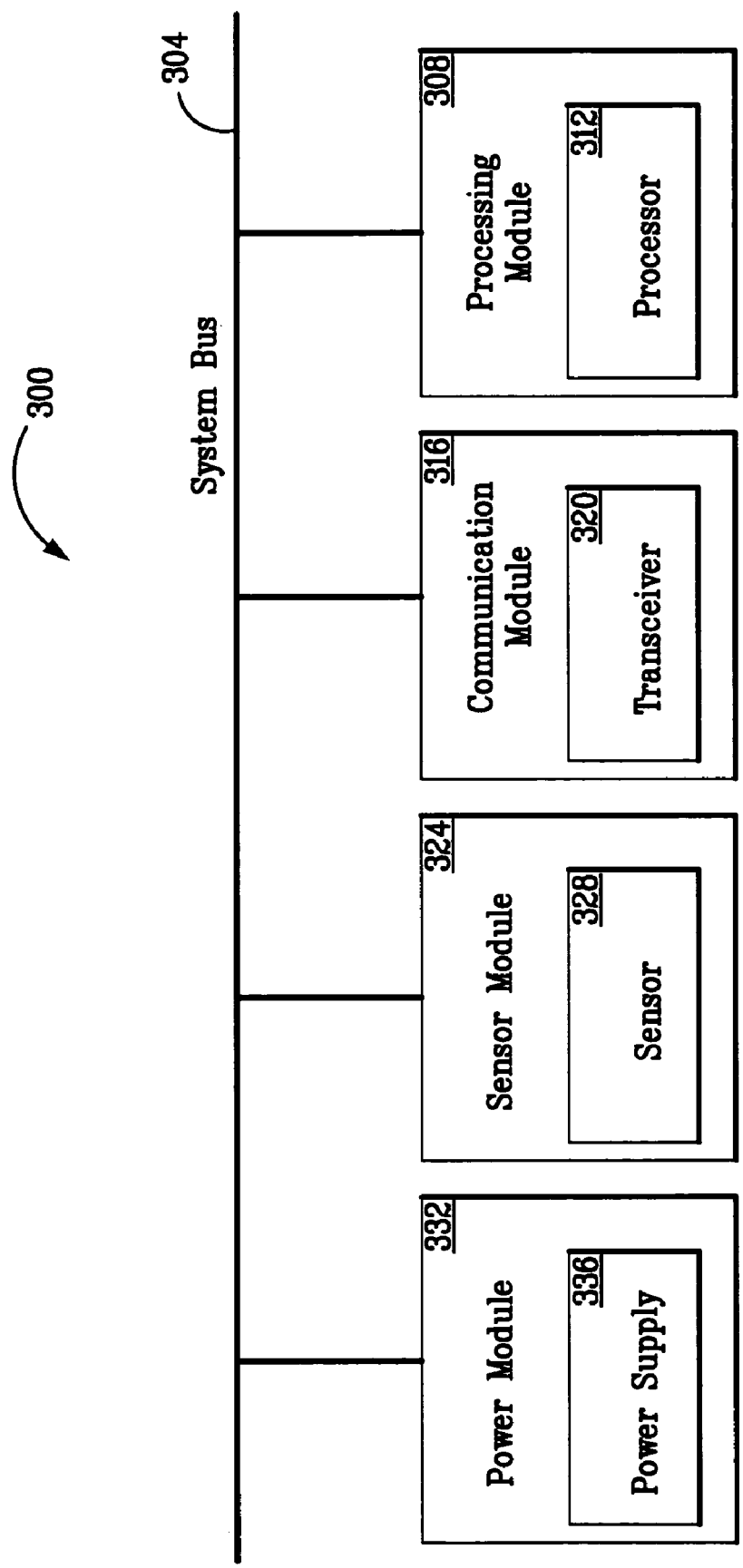
FIG. 3 is a block diagram of a sensor network node in accordance with one embodiment of the invention.

FIG. 3 is a block diagram of a wireless sensor network node 300 in accordance with one embodiment of the invention. The node 300 includes a system bus 304 that is connected to a processing module 308. The processing module 308 includes a general purpose processor 312 such as a microprocessor. As will be described later, the general purpose processor 312 performs complex processing tasks such as data processing and analysis related to an event, an object or the environment. The general purpose processor 312 functions as a shared resource for all other modules in the node 300. Other modules in the node 300 may request the processing module 308 to perform tasks that the other modules do not have the resources to perform.

The node 300 also includes a communication module 316 connected to the system bus 304. The communication module 316 includes a transceiver 320, which may be an optical transceiver, a wireless transceiver or any other type of transceiver. In one embodiment, the communication module 316 includes a wireless transceiver and a wire-line or an optical transceiver. The transceiver 320 allows the node 300 to communicate with other nodes in the network or the base station 124 (shown in FIG. 1).

The communication module 316 performs all necessary functions required to allow the node 300 to communicate with other nodes in the network and also with the base station, thus allowing the other modules in the node 300 to completely rely on the communication module 316 for all external, i.e. off-node, communications needs. Additionally, the communication module 316 performs network related tasks such as, for example, routing network traffic not intended for the local node (i.e., node 300) without involving the other modules in the node 300, thus allowing the other modules in the node 300 to be undisturbed by network related events that do not concern the other modules.

The node 300 also includes a sensor module 324 that is connected to the system bus 304. The sensor module 324 includes a sensor 328 designed to sense or detect parameters such as, for example, sound, seismic activities or other parameters. The sensor 328 may also be designed to detect chemical or biological agents or radiation or any other parameters that can be sensed. In one embodiment, the node 300 can have a plurality of sensor modules 324. Also, if the application requires, one or more sensor nodes 300 can be added or removed from the network. The sensor module 324 includes a resource specific processor (not shown in FIG. 3) that controls and manages the sensor 328. The resource specific processor is a low power processor having limited processing capability. The sensor module 324 may also be capable of storing a small amount of data from sensor readings. The operation of the sensor module 324 and the resource specific processor will be described in more detail later.

The node 300 also includes a power supply module 332 that is connected to the system bus 304. The power supply module 332 provides power to the various modules of the node 300 via the system bus 304. The power supply module 332 includes one or more regulated power supplies 336 that provide one or more regulated voltages. In one embodiment, the power supply module 332 includes one or more regulators to provide 3.3 volts DC or 5.0 volts DC or other desired voltages to the node 300. In many applications, it is necessary to control and limit the amount of power being used by the node. In many remote applications, only battery power may be available to the node 300. Thus it is necessary to limit the amount of power being used. Consequently, it is necessary to carefully monitor the amount of power being used. In one embodiment, the power supply module 332 includes a processor (not shown in FIG. 3) to monitor how much power has been consumed and how much power is left in the batteries.

Figure 4:
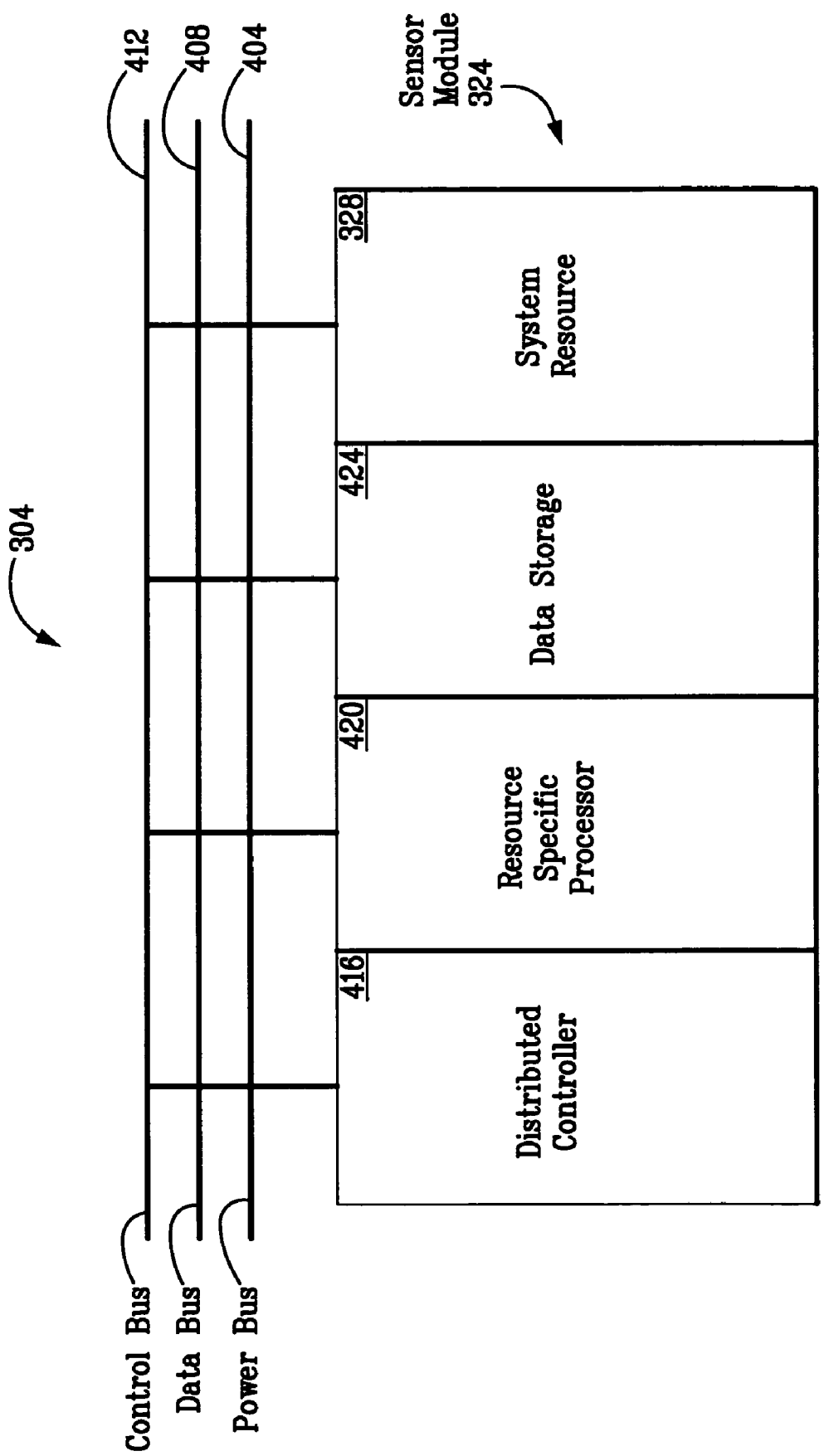
FIG. 4 is a block diagram of a sensor module used in the sensor network node of FIG. 3.

FIG. 4 is a detailed block diagram of the sensor module 324 and the system bus 304 (shown in FIG. 3). The system bus 304, to which the sensor module 324 is connected, includes a power bus 404, may include one or more data buses 408, and a control bus 412. The power supply module 332 (shown in FIG. 3) provides regulated power that is distributed by the power bus 404 among various modules of the node 300 (shown in FIG. 3). In one embodiment, the power bus 404 distributes 3.3 V, 5 V or any other desired voltage from batteries or other power sources in the power module 332 (shown in FIG. 3). The power bus 404 also provides ground to the sensor module 324.

The control bus 412 is generally used to transmit control signals (low bandwidth signals) among the modules 308-332 (shown in FIG. 3). For example, a short message identifying that a new sensor module 324 has been added to the node 300 can be broadcast on the control bus 412. The other modules 316-332 can receive the short message over the control bus 412. In contrast, the data bus 408 allows high bandwidth transmission among the modules 308-332. By separating the data bus 312 from the control bus 308, shorter control messages can be transmitted without being delayed by longer data messages and longer data messages can utilize a more powerful higher bandwidth bus.

The sensor module 324 also includes a distributed controller 416. In one embodiment, the distributed controller 416 includes a power control algorithm designed to lower the overall power consumption of the sensor module 324. The distributed controller also includes communication algorithms to allow the sensor module 324 to communicate with any other module in the node. These communications may provide for identification of the other modules present in the node, requests for utilization of the other system resources on other modules, or for other purposes. The distributed controller 416 can be implemented as software, can be implemented as an application specific integrated circuit (ASIC), or can be implemented on a field programmable gate array (FPGA) or programmable logic device (PLD).

The sensor module 324 also includes a processor 420, which is designed to perform specific sensor related tasks. The processor 420 is also referred to as the resource specific processor 420. In one embodiment, the resource specific processor 420 is a low power, low computational processor capable of configuring the sensor module 324, reading data collected by the sensor module 324, and may perform preliminary data analysis. Since the resource specific processor 420 is a low computational performance processor, it does not perform any significant data analysis, and thus uses only a limited amount of power.

In contrast, the general purpose processor 312 (shown in FIG. 3) is a high performance microprocessor capable of complicated data analysis necessary to evaluate a detected event or an object. If the resource specific processor 420 determines that the data collected by the sensor module 324 needs to be analyzed in greater detail, the data is preferably transmitted to the processing module 308 for analysis. In one embodiment, the general purpose processor 312 will perform computations on the collected data such as, for example, a fast Fourier transform (FFT), pattern recognition, or another type of computation. The general purpose processor 312 will then analyze the results of these computations to determine if something of importance exists in the data such as, for example, the detection of an unknown object or event in the surrounding environment. The general purpose processor 312 may also perform data fusion on data collected from a plurality of sensor modules. The general purpose processor 312 may also perform distributed computations with other nodes in the network or communicate data and/or processing results to a base station.

In one embodiment, the sensor module 324 is an acoustic sensor module. The acoustic sensor module may operate on a "trip" mode where it simply waits for any sound. When there is a sound, the acoustic sensor module trips and starts recording data. The recorded data is transmitted to the processing module 308 (shown in FIG. 3) with instructions to analyze and identify the sound. The act of tripping on a sound and recording the data does not require significant processing power, and thus can be controlled by the resource specific processor 420. In contrast, analyzing the data to identify the sound requires considerable processing power, which is performed by the processing module 308 (shown in FIG. 308). The need to identify the sound does not arise very often, allowing the processing module 308 (shown in FIG. 3) to remain asleep most of the time. During periods when identification of sound is not needed, only the resource specific processor 420 on the sensor module 324 needs to be active.

In one embodiment the sensor module may include a camera. The camera can be a digital, optical, video or any other type of camera.

The sensor module 324 may also include a data storage device 424, which allows the module 324 to store data. The data storage device 424 can either be separate from the resource specific processor 420 or integrated into the resource specific processor 420. In one embodiment, the sensor module 324 includes a first data storage device integrated into the processor 420 for buffering data and a second data storage device separate from the processor 420 for off-chip storage of long-term data. This second data storage device may be in a form such as, for example, a random access memory (RAM) chip, an electronically erasable programmable read-only memory (EEPROM) chip, a flash memory storage device, or other storage types.

The sensor module 324 includes a sensor 328 designed to sense and detect an event, an object, or any other parameter that can be sensed. The sensor 328 is also referred to as the system resource 328, which performs the primary task of the module 324. For example, in the case of an acoustic sensor module, the system resource 328 is an acoustic sensor, and in the case of a radiation sensor module, the system resource 328 is a radiation sensor.

The distributed controller 416, the resource specific processor 420, the data storage 424 and the system resource 328 can be implemented separately on the module 324, integrated into a single chip, or combined in some other manner.

In one embodiment, the resource specific processor 420 is a customized processor designed to perform simple tasks. The resource specific processor 420 can manage basic functions of the sensor module 324 such as turning on or off the system resource 328. The resource specific processor 420 can receive a sensor reading, perform simple preliminary computations on this data, and store a small amount of data in the data storage 424. Also, the resource specific processor 420 can act as a router for network traffic received by a transceiver 320 on the communication module 316. During operation, the node 300 (shown in FIG. 3) may receive wireless traffic that is not intended for the node 300, but must be routed to another node. The resource specific processor 420 routes wireless traffic that is not intended for the local node, i.e., node 300, without disturbing any other modules. For a processing module 308, the resource specific processor 420 may act as a processing request scheduler and manage processing request responses. These processing requests may come to the processing module 308 from another module, another node, or a base station.

The basic management of the sensor module 324 is separated from the central processor, i.e., the processing module 308 (shown in FIG. 3), and is assigned to the resource specific processors 420, so that the processing module 308 need not be involved in routine tasks. The processing module 308 (shown in FIG. 3) can be dormant and save power while the resource specific processors 420, which use less power, perform basic management tasks and other routine tasks of each individual module and between modules, and thus for the node as a whole.

There are instances when the processing module 308 (shown in FIG. 3) must act. For example, if an input to a sensor exceeds a predetermined threshold, the processing module 308 may be awakened. Also, if a wireless packet is destined for the local node, the processing module 308 (shown in FIG. 3) can be awakened. At that time, the data can be transferred to the general purpose processor 312 (shown in FIG. 3), and its full capabilities can be utilized to process the data.

The node 300 (shown in FIG. 3) allows easy upgradeability. If a technology advancement is made in a particular module in the node 300, the module can be replaced, and a complete system redesign, as in the case of a conventional centralized system, is unnecessary.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A sensor module for a wireless sensor network node comprising:
   a system resource configured to sense a parameter and operable to generate data representative of the sensed parameter;
   a low performance processor coupled to the system resource and configured to control the system resource, a low computation processor adapted to receive the data from the system resource and operable to determine if further analysis of the data is necessary;
   a distributed controller coupled to the low performance processor and operable to regulate the power consumption of the sensor module, the distributed controller configured to allow the sensor module to communicate with other modules in the node; and
   a data store coupled to the low performance processor and adapted to store data collected by the system resource.

2. The sensor module of claim 1 wherein the low performance processor is a resource specific processor designed to control and manage the system resource.

3. The sensor module of claim 1 wherein the low performance processor sends the collected data to a processing module if analysis is necessary.

4. The sensor module of claim 1 wherein the system resource is an acoustic sensor.

5. The sensor module of claim 1 wherein the system resource is a seismic sensor.

6. The sensor module of claim 1 wherein the system resource is a radiation sensor.

7. The sensor module of claim 1 wherein the sensor module is connected to a system bus.

8. The sensor module of claim 7 wherein the system bus comprises a power bus adapted to provide a regulated voltage to the sensor module.

9. The sensor module of claim 7 wherein the system bus comprises a data bus adapted to transmit data to and from the sensor module.

10. The sensor module of claim 7 wherein the system bus comprises a control bus adapted to transmit control signals to and from the sensor module.

11. A wireless sensor network node comprising:
    at least one sensormodule coupled to a system bus, wherein the sensor module comprises:
    a system resource adapted to sense a parameter and operable to generate data representative of the sensed parameter;
    a low performance processor coupled to the system resource and configured to control the system resource, a low computation processor adapted to receive the data from the system resource and operable to determine if further analysis of the data is necessary;
    a distributed controller coupled to the low performance processor and operable to regulate the power consumption of the sensor module, the distributed controller configured to allow the sensor module to communicate with other modules in the node; and
    a data store coupled to the low performance processor and adapted to store data collected by the system resource;
    a communication module coupled to the system bus and configured to allow the wireless network node to communicate with external devices;
    a processing module coupled to the system bus, the processing module adapted to receive data from the sensor module and operable to analyze the data to evaluate the sensed parameter;
    a power module connected to the system bus and operable to generate a regulated voltage for the wireless network node.

12. The wireless sensor network node of claim 11 wherein the communication module includes a wireless transceiver configured for communication with a base station and other nodes.

13. The wireless sensor network node of claim 11 wherein the power module includes a regulated power supply operable to generate regulated power for the wireless sensor network node.

14. The wireless sensor network node of claim 11 wherein the power module includes at least one power source to provide a regulated voltage to the wireless sensor network node.

15. The wireless sensor network node of claim 11 wherein the processing module includes a high performance microprocessor configured to receive data from other modules and operable to analyze the data.

16. The wireless sensor network node of claim 11 wherein the low performance processor is a resource specific processor designed to control and manage the system resource.

17. The wireless sensor network node of claim 11 wherein the system resource is an acoustic sensor.

18. The wireless sensor network node of claim 11 wherein the system resource is a seismic sensor.

19. The wireless sensor network node of claim 11 wherein the system resource is a digital signal processor.

20. A wireless sensor network comprising:
    a plurality of sensor nodes connected to each other over a communication link;
    a base station in communication with the sensor nodes via wireless communication; wherein each sensor node further comprises:
    at least one sensor module coupled to a system bus, wherein the sensor module comprises:
    a system resource adapted to sense a parameter and operable to generate data representative of the sensed parameter;
    a low performance processor coupled to the system resource and configured to control the system resource;

a low computation processor adapted to receive the data from the system resource and operable to determine if further analysis of the data is necessary;

a distributed controller coupled to the low performance processor and operable to regulate the power consumption of the sensor module, the distributed controller configured to allow the sensor module to communicate with other modules in the node; and a data store coupled to the low performance processor and adapted to store data collected by the system resource;

a communication module coupled to the system bus and configured to allow the wireless network node to communicate with other nodes;

a processing module coupled to the system bus, the processing module adapted to receive data from the sensor module and operable to analyze the data to evaluate the parameter; and a power module connected to the system bus and operable to generate a regulated voltage for the sensor node.

21. The wireless sensor network of claim 20 wherein the low performance processor is a resource specific processor designed to control and manage the system resource.

22. The wireless sensor network of claim 20 wherein the sensor module sends the data to a processing module for analysis.

23. The wireless sensor network of claim 20 wherein the system resource is an acoustic sensor.

24. The wireless sensor network of claim 20 wherein the system resource is a digital signal processor.

25. The wireless sensor network of claim 20 wherein the system resource is a radiation sensor.

26. The wireless sensor network of claim 20 wherein the system resource is a seismic sensor.

* * * * *